United States Patent
Gerber et al.

[15] 3,668,366
[45] June 6, 1972

[54] RESISTANCE WELDING APPARATUS

[72] Inventors: Johannes F. Gerber, King of Prussia; Rudolph A. Cola, Malvern, both of Pa.

[73] Assignee: Burroughs Corporation, Detroit, Mich.

[22] Filed: Feb. 17, 1971

[21] Appl. No.: 116,156

[52] U.S. Cl. .................................................. 219/158
[51] Int. Cl. ..................................................B21j 13/08
[58] Field of Search ...................... 219/78, 80, 107, 117, 158, 219/159, 160

[56] References Cited
UNITED STATES PATENTS

| 1,532,833 | 4/1925 | Meadowcroft | 219/158 X |
| 2,256,988 | 9/1941 | Michailoff | 219/159 |
| 2,473,633 | 6/1949 | Brown, Jr. | 219/158 X |

Primary Examiner—C. L. Albritton
Attorney—Paul W. Fish, Edward J. Feeney, Jr. and Charles S. Hall

[57] ABSTRACT

A welding apparatus which permits accurate spacing of workpieces, and eliminates arcing of the welding current and contamination of the workpieces.

3 Claims, 5 Drawing Figures

INVENTORS.
JOHANNES F. GERBER
RUDOLPH A. COLA
BY Samuel Kane
ATTORNEY

INVENTORS.
JOHANNES F. GERBER
RUDOLPH A. COLA
BY
*Samuel Kane*
ATTORNEY

3,668,366

RESISTANCE WELDING APPARATUS

BACKGROUND OF THE INVENTION

This invention relates generally to welding apparatus and particularly to apparatus for performing precision resistance welding. While not limited thereof, the invention finds special application for welding permalloy chips to tungsten filaments in the process of preparing these materials for use in the vacuum deposition of thin magnetic films, and therefore the invention will be described hereinafter in connection with such use.

In performing precision welding, such as the welding of permalloy chip evaporants to tungsten filaments for use in vacuum deposition, for example, it is necessary to avoid arcing of the welding current to the welding fixture, and to avoid contamination of the workpieces with fixture particles due to the wearing or chipping of the fixture. The construction of prior art precision resistance welding apparatus has been aimed at overcoming the arcing problem by utilizing various dielectric materials for the fixture material whose resistance is high relative to the resistance of the welding electrodes and the workpieces, and thereby attempting to force the welding current to flow directly from one electrode to the other so as to take the shortest path through the workpieces. However, these dielectric fixture materials have been unsatisfactory because they contaminate the workpieces.

Plastics, for example, wear easily so that the particles due to wear become attached to the workpieces. If the illustrative permalloy chip evaporants are workpieces, the plastic particles would evaporate along with the chip material and contaminate the thin film deposition. Dielectric refractory materials such as ceramics and glass tend to chip so that the resulting small particles would similarly attach to the permalloy evaporants and contaminate the thin film deposition.

SUMMARY OF THE INVENTION

An object of the invention, therefore, is to provide a welding apparatus which eliminates arcing of the welding current to the welding fixture.

Another object of the invention is to provide a welding apparatus in which the workpieces are not contaminated with particles from the welding fixture.

A further object of the invention is to provide a welding apparatus which permits precision spacing of a number of workpieces on a common workpiece.

Still another object of the invention is to provide a welding apparatus which is simple to use and inexpensive to manufacture.

In accordance with the above objects, and considered first in one of its broader aspects, a resistance welding apparatus according to the invention may comprise two welding electrodes and a fixture for locating workpieces between the electrodes. The fixture is constructed of a metal whose resistance is high relative to the resistance of the electrodes and workpieces and of such relative value that welding current flowing through the electrodes and workpieces will not arc to the fixture.

The invention will be more clearly understood when the following detailed description of the preferred embodiment thereof is read in conjunction with the accompanying drawing which is described below.

DESCRIPTION OF THE PREFERRED EMBODIMENT

Figure 1:
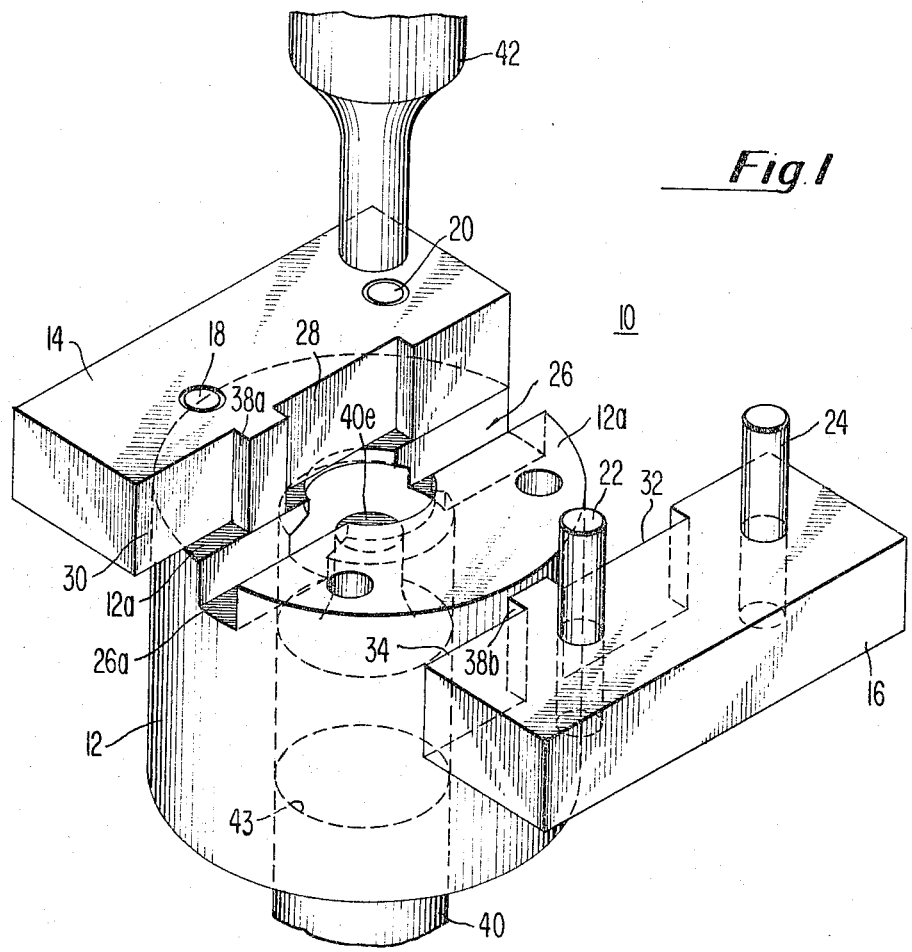
FIG. 1 is a partly exploded isometric view of a resistance welding apparatus constructed in accordance with the invention.

Turning to the drawing, the illustrated embodiment of the invention comprises a welding fixture 10 (FIG. 1) constructed of a base 12 and locating plates 14 and 16, all constructed of a high resistance refractory metal, such as molybdenum, for example. Tantalum and tungsten are additional examples of high resistance refractory metals which are suitable for making the fixture 10.

Figure 2:
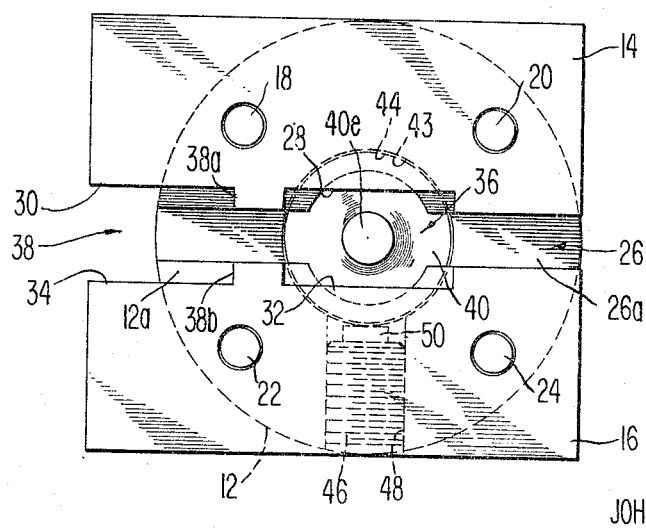
FIG. 2 is a plan view of the assembled welding fixture and lower welding electrode of FIG. 1.

The locating plate 14 is located and secured to the base 12 by means of dowel pins 18 and 20, and the locating plate 16 is similarly located and secured to the base 12 by means of dowel pins 22 and 24. The locating plates 14 and 16 are spaced in the fixture 10 so as to form a vertical extension of a slot 26 in the base 12. Locating plate 14 is provided with openings or cut out portions 28 and 30 and locating plate 16 is similarly provided with openings or cut out portions 32 and 34 (see also FIG. 2). The openings 28 and 32 cooperate to form a locating cavity 36, and the openings or cut out portions 30 and 34 cooperate to form a locating cavity 38.

Figure 4:
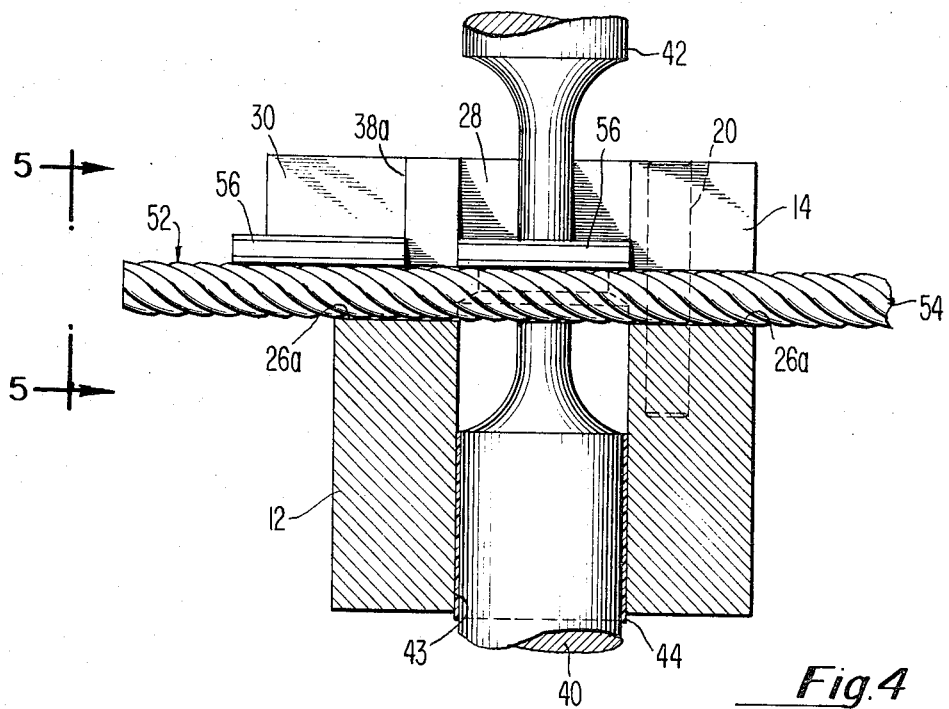
FIG. 4 is a sectional view taken along line 4—4 of FIG. 3 and showing the welding electrodes in position for making a weld.
Figure 5:
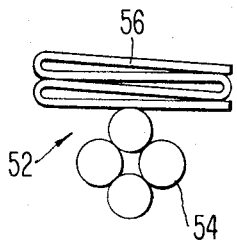
FIG. 5 is an enlarged side elevational view of the weldment as seen in the direction of arrows 5—5 of FIG. 4.

Two welding electrodes 40 and 42 (FIGS. 1 and 4), which may be made of copper, for example, are adapted to be connected to a suitable source of welding current. The welding electrode 40 is positioned in an opening 43 in the base 12 and has its end face 40e coplanar with or slightly above the bottom surface 26a of the slot 26. A strip of electrical insulating material 44 (FIG. 4), which may be mylar, for example, encircles a portion of the electrode 40 and insulates the electrode 40 form the base 12. A screw 46 (FIG. 2) threaded into a tapped hole 48 in the base 12 secures the electrode 40 to the base 12. A block of electrical insulating material 50 may be provided in the tapped hole 48 between the screw 46 and the insulation 44.

Figure 3:
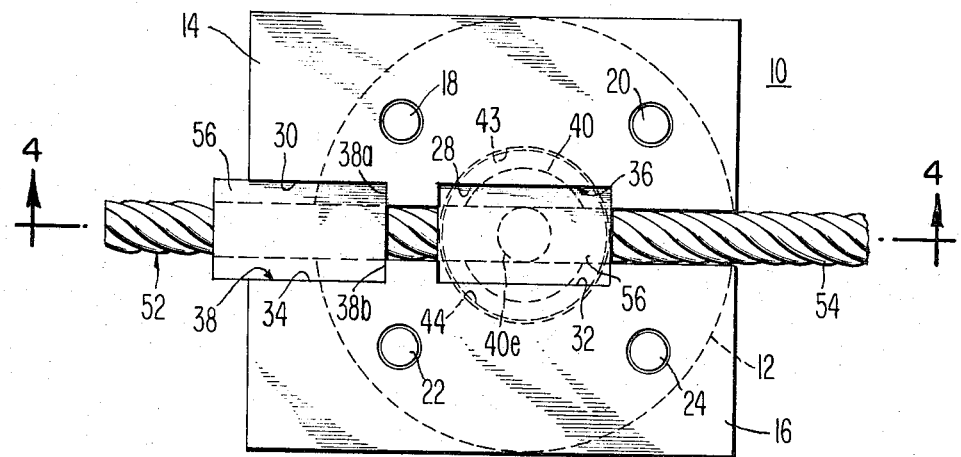
FIG. 3 is a view similar to FIG. 2 and including a weldment which is welded by the apparatus of the invention.

A weldment 52 (FIGS. 3 and 4) is one example of the kind of welding that can be performed with the invention and comprises an elongate stranded tungsten filament 54 and a number of accurately spaced permalloy chips 56 welded to the filament 54. The weldment 52 is used in a vacuum deposition process in which the permalloy chips 56 are evaporated to obtain an even distribution and deposited on a substrate to form magnetic thin films. The permalloy chips 56 are therefore referred to as "evaporants."

The operation of fabricating a weldment 52 is commenced by first placing a filament 54 into the slot 26 so that it rests on the bottom 26a and makes contact with the electrode face 40e. A permalloy chip or evaporant 56 is next dropped into the locating cavity 36 so that it rests on the top surface 12a of the base 12 and in contact with the filament 54. The electrode 42 is lowered into the locating cavity 36 and pressed downwardly on the permalloy evaporant 56. An electric current is then discharged through the welding electrodes 40 and 42 and the evaporant 56 and filament 54 until the evaporant 56 is welded to the filament 54. The weldment is then lifted out of the fixture 10 and relocated in the fixture 10 by placing the filament 54 back into the slot 26 and locating the welded evaporant 56 in the locating cavity 38 so that it rests on the surface 12a. Another evaporant 56 is then dropped into the locating cavity 36 and another weld made, as described previously. In making the second and subsequent welds, accuracy in spacing between the evaporants 56 is obtained if the filament 54 is pulled slightly to the right, as viewed in FIG. 3, just before welding, so that the previous welded evaporant 56 bears against the surfaces 38a and 38 b of the locating cavity 38.

The resistance of the fixture 10 is high relative to the resistance of the electrodes 40 and 42 and the evaporant 56 and filament 54, so that arcing is eliminated. By using a refractory metal for the fixture 10, contamination of the evaporant 56 is also eliminated. The high resistance refractory fixture metal, or such a high resistance metal that is close to being a refractory metal, is desirable because it is less susceptible to heat or chipping than ceramics or other similar substances, and is more wear-resistant than organic insulators.

What is claimed is:

1. Apparatus for resistance welding a plurality of first workpieces to a common elongate workpiece in a linear array of equally-spaced positions comprising first and second welding electrodes and a fixture for locating workpieces between the electrodes and beyond the electrodes, said fixture constructed of a metal whose resistance is high relative to the resistance of said electrodes and workpieces and of such relative value that welding current flowing through said electrodes and workpieces will not arc to said fixture and comprising a slot for locating a said common elongate workpiece so that a portion of it is in contact with said first electrode, and first and second locating portions intersecting said slot, said first locating portion positioned between the electrodes for positioning a said first workpiece so that it rests on said common elongate workpiece for welding, said second locating portion having at least one locating surface beyond said electrodes for positioning a welded first workpiece while a succeeding first workpiece is being welded in said first locating portion.

2. Apparatus according to claim 1 wherein said fixture is constructed of a refractory metal.

3. Apparatus according to claim 2 including electrical insulating material between said fixture and said first electrode.

* * * * *